United States Patent
Nakahira et al.

(10) Patent No.: US 11,903,025 B2
(45) Date of Patent: Feb. 13, 2024

(54) WIRELESS COMMUNICATION METHOD AND BASE STATION

(71) Applicant: NIPPON TELEGRAPH AND TELEPHONE CORPORATION, Tokyo (JP)

(72) Inventors: Toshiro Nakahira, Musashino (JP); Tomoki Murakami, Musashino (JP); Hirantha Abeysekera, Musashino (JP); Koichi Ishihara, Musashino (JP); Takafumi Hayashi, Musashino (JP); Yasushi Takatori, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 326 days.

(21) Appl. No.: 17/439,892

(22) PCT Filed: Mar. 11, 2020

(86) PCT No.: PCT/JP2020/010643
§ 371 (c)(1),
(2) Date: Sep. 16, 2021

(87) PCT Pub. No.: WO2020/195856
PCT Pub. Date: Oct. 1, 2020

(65) Prior Publication Data
US 2022/0191931 A1 Jun. 16, 2022

(30) Foreign Application Priority Data

Mar. 25, 2019 (JP) .................................. 2019-057393

(51) Int. Cl.
*H04L 5/00* (2006.01)
*H04W 74/08* (2009.01)

(52) U.S. Cl.
CPC ....... *H04W 74/0816* (2013.01); *H04L 5/0053* (2013.01)

(58) Field of Classification Search
CPC . H04W 74/0816; H04W 24/02; H04W 84/12; H04L 5/0053
See application file for complete search history.

(56) References Cited

U.S. PATENT DOCUMENTS

2007/0050240 A1* 3/2007 Belani ................... G08G 1/14
705/13
2009/0225682 A1* 9/2009 Grote-Lopez ....... H04L 41/0866
370/255

(Continued)

OTHER PUBLICATIONS

IEEE Std 802.11ac-2013, Dec. 2013.
International Search Report issued in PCT/JP2020/010643, dated Jun. 16, 2020.

*Primary Examiner* — Hoang-Chuong Q Vu
(74) *Attorney, Agent, or Firm* — Harness, Dickey & Pierce, P.L.C.

(57) ABSTRACT

A wireless communications method for connecting a base station with each of a plurality of terminal stations, the base station being equipped with a plurality of wireless communications units each configured to be able to selectively enable or disable an RTS/CTS function and a NoACK function and connectable with one or more of the terminal stations, includes: a collection step of collecting information as to whether each of the terminal stations is a hidden terminal and information about transmission characteristics of each of the terminal stations; a policy calculation step of calculating a setting policy for enabling or disabling the RTS/CTS function and the NoACK function for each of the wireless communications units and a switching policy for setting a condition for switching that one of the wireless communications units which is to be connected, for each of the terminal stations, based on the collected information;

(Continued)

and a setting step of setting those of the terminal stations which are to be connected, for each of the wireless communications units based on the calculated setting policy and switching policy.

2 Claims, 10 Drawing Sheets

(56) References Cited

U.S. PATENT DOCUMENTS

| | | | | |
|---|---|---|---|---|
| 2011/0292897 A1* | 12/2011 | Wu | ........................ | H04W 72/52 370/329 |
| 2012/0075987 A1* | 3/2012 | Yoneyama | ............ | H04W 24/04 370/216 |
| 2021/0029552 A1* | 1/2021 | Murayama | ............ | H04W 16/14 |

* cited by examiner

Fig. 4

| CLASS | HIDDEN-TERMINAL ENVIRONMENT? | NoACK FUNCTION AVAILABLE? |
|---|---|---|
| A | × | × |
| B | × | ○ |
| C | ○ | × |
| D | ○ | ○ |

Fig. 8

| CLASS | HIDDEN-TERMINAL ENVIRONMENT? | NoACK FUNCTION AVAILABLE? | SETTING POLICY |
|---|---|---|---|
| A | × | × | POLICY X1 |
| B | × | ○ | |
| C | ○ | × | |
| D | ○ | ○ | POLICY X2 |

Fig. 9

|  |  | SWITCHING POLICY |
| --- | --- | --- |
| FIRST TERMINAL STATION 10 | CLASS A | POLICY Y1 |
| SECOND TERMINAL STATION 20 | CLASS B | |
| THIRD TERMINAL STATION 30 | CLASS C | |
| FOURTH TERMINAL STATION 40 | CLASS D | POLICY Y2 |

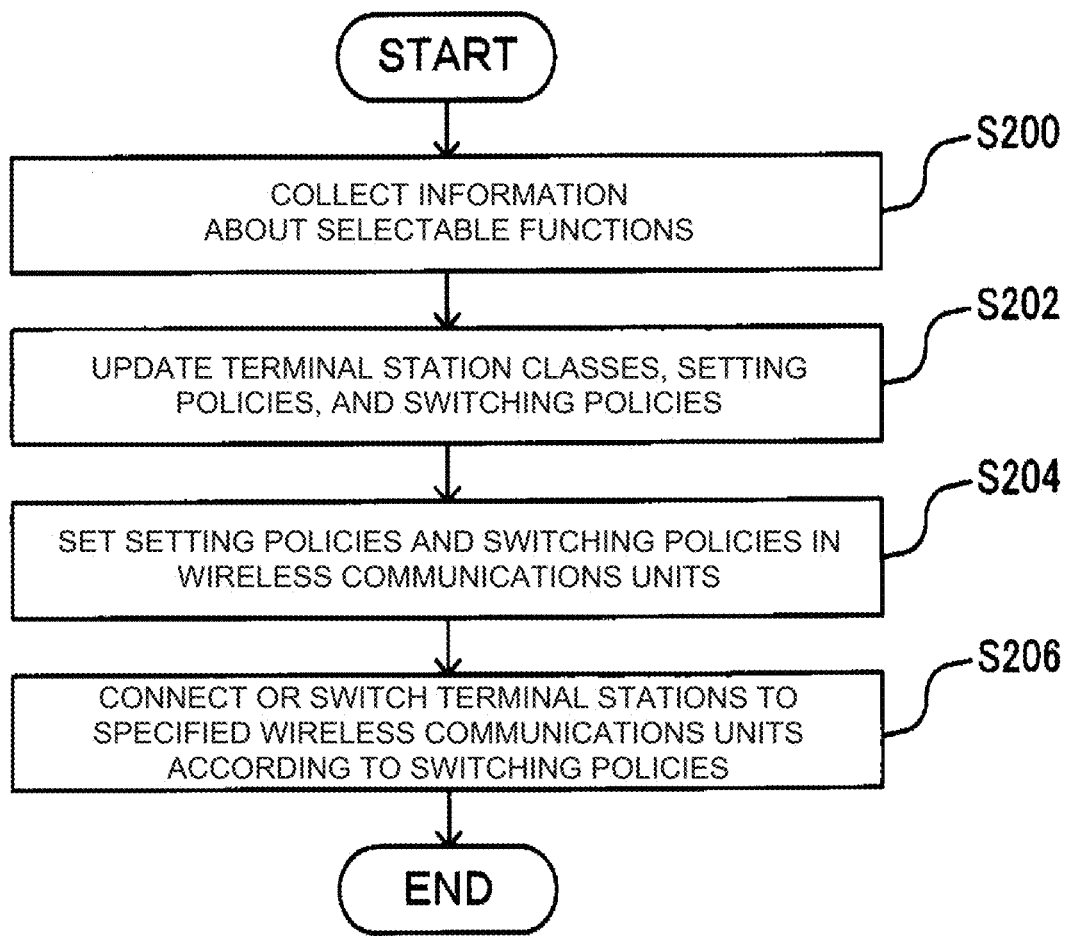

WIRELESS COMMUNICATION METHOD AND BASE STATION

CROSS-REFERENCE TO RELATED APPLICATIONS

This application is a 371 U.S. National Phase of International Application No. PCT/JP2020/010643, filed on Mar. 11, 2020, which claims priority to Japanese Application No. 2019-057393, filed on Mar. 25, 2019. The entire disclosures of the above applications are incorporated herein by reference.

TECHNICAL FIELD

The present invention relates to a wireless communication method and base station.

BACKGROUND ART

High-speed radio access systems that use radio waves in the 5-GHz band include wireless LANs based on IEEE 802.11a, 11n, and 11ac standards. With the 11a standard, a transmission rate of up to 54 Mbit/s is achieved by stabilizing characteristics in a multipath fading environment based on orthogonal frequency division multiplexing (OFDM) modulation scheme. Furthermore, with the 11n standard, a transmission rate of up to 600 Mbit/s is achieved using MIMO (Multiple Input Multiple Output) or channel bonding technology, where the MIMO technology implements space-division multiplexing on the same radio channel using plural antennas while the channel bonding technology implements a 40-MHz frequency channel using two 20-MHz frequency channels simultaneously.

Besides, with the 11ac standard, wireless communications higher in speed and efficiency than the 11n standard are implemented by means of channel bonding technology that realizes a frequency channel for up to 160 MHz using up to eight 20-MHz frequency channels simultaneously, downlink multi-user MIMO technology that simultaneously transmits different signals to multiple destinations on the same channel, or other technology (see, for example, Non-Patent Literature 1).

At present, an IFEE802.11ax standard that focuses on improvement of transmission efficiency in addition to improvement of transmission rate is being worked out. With the 11ax standard, promotion of spatial frequency reuse by means of simultaneous transmission and efficiency improvement of the OFDM modulation scheme as well as uplink and downlink OFDMA transmission and uplink multi-user MIMO transmission in terms of multi-user transmission are expected to become available for use.

Also, it is known that the wireless LAN uses RTS (Request to Send) and CTS (Clear to Send) to alleviate a hidden-terminal problem. Furthermore, it is known that to improve transmission efficiency, the wireless LAN uses NoACK function that does not transmit an acknowledge signal (ACK).

CITATION LIST

Non-Patent Literature

Non-Patent Literature 1: IEEE Std 802.11ac-2013, December 2013.

SUMMARY OF THE INVENTION

Technical Problem

Conventionally, the use of RTS/CTS, which can alleviate the bidder-terminal problem, has been able to prevent reduction in transmission rate caused by radio interference. However, if RTS/CTS is used for a terminal that does not become a hidden terminal, the signal creates an overhead, causing reduction in transmission efficiency.

Also, the use of the NoACK function improves the transmission efficiency of terminals with good transmission characteristics, but disables terminals with poor transmission characteristics from carrying out retransmission, which results in deterioration of communications quality.

An object of the present invention is to provide a wireless communications method and base station that can improve transmission efficiency even when conducting wireless communications with each of plural terminal stations differing in environment or transmission characteristics.

Means for Solving the Problem

According to one aspect of the present invention, there is provided a wireless communications method for connecting a base station with each of a plurality of terminal stations, the base station being equipped with a plurality of wireless communications units each configured to be able to selectively enable or disable an RTS/CTS function and a NoACK function and connectable with one or more of the terminal stations, the method comprising: a collection step of collecting information as to whether each of the terminal stations is a hidden terminal and information about transmission characteristics of each of the terminal stations; a policy calculation step of calculating a setting policy for enabling or disabling the RTS/CTS function and the NoACK function for each of the wireless communications units and a switching policy for setting a condition for switching that one of the wireless communications units which is to be connected, for each of the terminal stations, based on the collected information; and a setting step of setting those of the terminal stations which are to be connected, for each of the wireless communications units based on the calculated setting policy and switching policy.

According to another aspect of the present invention, there is provided a base station connected with each of a plurality of terminal stations, the base station comprising: a plurality of wireless communications units each configured to be able to selectively enable or disable an RTS/CTS function and a NoACK function and connectable with one or more of the terminal stations, a collection unit configured to collect information as to whether each of the terminal stations is a hidden terminal and information about transmission characteristics of each of the terminal stations; a policy calculation unit configured to calculate a setting policy for enabling or disabling the RTS/CTS function and the NoACK function for each of the wireless communications units and a switching policy for setting a condition for switching that one or the wireless communications units which is to be connected, for each of the terminal stations, based on the information collected by the collection unit; and a setting unit configured to set those of the terminal stations which are to be connected, for each of the wireless communications units based on the setting policy and switching policy calculated by the policy calculation unit.

Effects of the Invention

The present invention makes it possible to improve transmission efficiency even when conducting wireless communications with each of plural terminal stations differing in environment or transmission characteristics.

BRIEF DESCRIPTION OF DRAWINGS

FIG. 4 is a table showing exemplary classes of terminal stations in a wireless communications system.

FIG. 8 is a table showing a relationship between the class of terminal stations and setting policy.

FIG. 9 is a table showing a relationship between the class of terminal stations and switching policy.

FIG. 10 is a flowchart showing a second operation example of the base station that uses the setting policy and switching policy.

DESCRIPTION OF EMBODIMENTS

Figure 1:
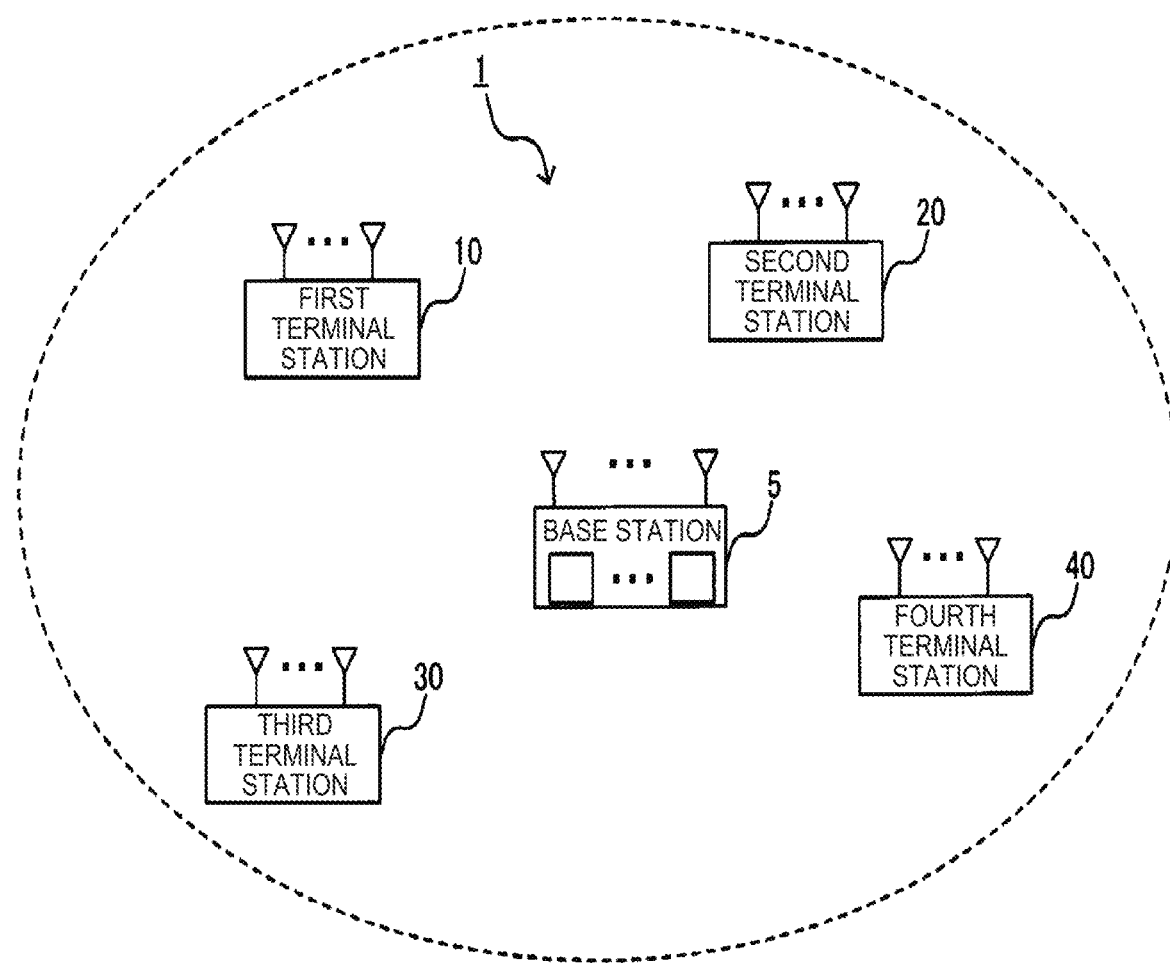
FIG. 1 is a diagram showing a configuration example of a wireless communications system according to an embodiment.

An embodiment of a wireless communications system will be described below with reference to the drawings. FIG. 1 shows a configuration example of a wireless communications system 1 according to the embodiment. As shown in FIG. 1, the wireless communications system 1 includes, for example, a base station 5, and a first terminal station 10, a second terminal station 20, a third terminal station 30, and a fourth terminal station 40 existing in a service area, which is an area in which communications can be conducted with the base station 5.

Here, the first terminal station 10, second terminal station 20, third terminal station 30, and fourth terminal station 40 differ from each other in environment and transmission characteristics. Also, plural terminal stations equal in environment and transmission characteristics to the first terminal station 10, second terminal station 20, third terminal station 30, and fourth terminal station 40, respectively, may exist in the service area of the base station 5.

Figure 2:
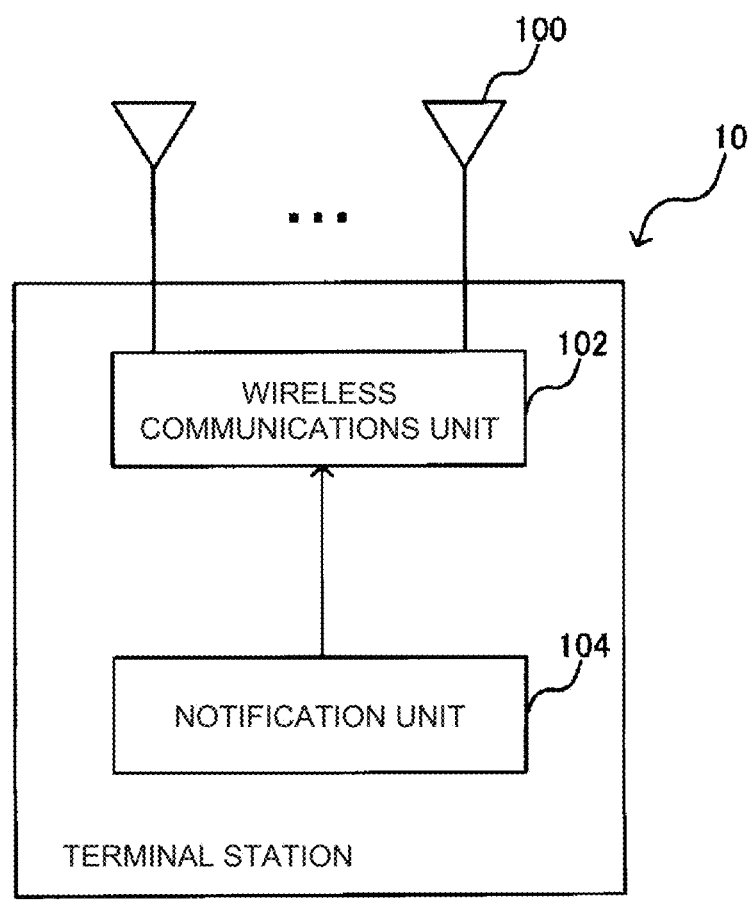
FIG. 2 is a diagram showing a configuration example of a first terminal station.

FIG. 2 shows a configuration example of the first terminal station 10. As shown in FIG. 2, the first terminal station 10 includes plural antennas 100, a wireless communications unit 102, and a notification unit 104. Note that other functional blocks which terminal stations are typically equipped with are not illustrated.

The antennas 100 are connected to the wireless communications unit 102, transmit radio frames inputted from the wireless communications unit 102, and outputs received radio frames to the wireless communications unit 102.

The wireless communications unit 102 converts information inputted, for example, from the notification unit 104 into radio frames, and outputs the radio frames to the antenna 100.

The notification unit 104 outputs information indicating wireless communications standards and communications schemes supported by the first terminal station 10 to the wireless communications unit 102.

Note that the second terminal station 20, third terminal station 30, and fourth terminal station 40 have configuration substantially equal to the first terminal station 10, but each differs from the first terminal station 10 in environment and transmission characteristics.

Figure 3:
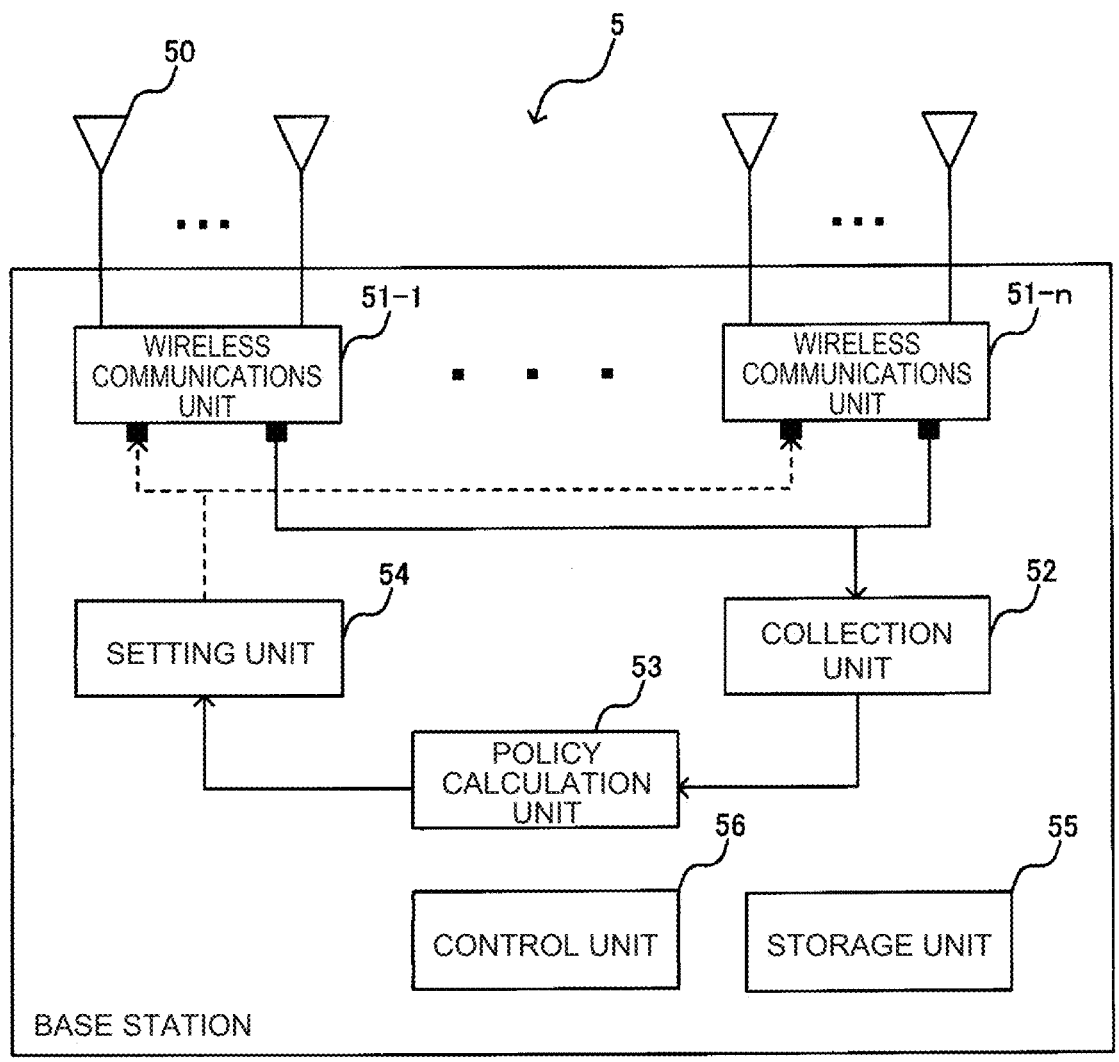
FIG. 3 is a diagram showing a configuration example of a base station according to the embodiment.

FIG. 3 shows a configuration example of the base station 5 according to the embodiment. As shown in FIG. 3, the base station 5 includes, for example, plural antennas 50, n wireless communications units 51-1 to 51-n, a collection unit 52, a policy calculation unit 53, a setting unit 54, a storage unit 55, and a control unit 56. Note that other functional blocks which base stations are typically equipped with are not illustrated.

Plural antennas 50 are connected to each of the wireless communications units 51-1 to 51-n and transmit wireless frames received from the connected wireless communications units 51-1 to 51-n and output the received wireless frames to the other wireless communications units 51-1 to 51-n.

Each of the wireless communications units 51-1 to 51-n is configured to be able to conduct wireless communications independently of one another, with one or more terminal stations (e.g., at least one of the first terminal station 10, second terminal station 20, third terminal station 30, and fourth terminal station 40) using an PTS/CTS function and NoACK function, for example, via plural antennas 50. Besides, each of the wireless communications units 51-1 to 51-n is configured to be able to selectively enable or disable an RTS/CTS function and a NoACK function.

From the wireless communications units 51-1 to 51-n, the collection unit 52 collects information about the environment and transmission characteristics of each terminal station as well as connection information about the terminal station and lists and outputs the collected information to the policy calculation unit 53. For example, the collection unit 52 collects information as to whether each terminal station is a hidden terminal and information about throughput characteristics, MCS (Modulation and channel Coding Scheme), and the like of the terminal station. Also, as connection information about the terminal station, the collection unit 52 collects the number of terminal stations connected to each of the wireless communications units 51-1 to 51-n, class of each terminal station, and estimated traffic volume.

Based on the information received from the collection unit 52, i.e., the information about the environment and transmission characteristics of each terminal station as well as the connection information about the terminal station, the policy calculation unit 53 calculates the two policies described below and outputs the policies to the setting unit 54. The first of the policies is a setting policy for enabling or disabling the RTS/CTS function and NoACK function with respect to each of the wireless communications units 51-1 to 51-n. The second of the policies is a switching policy for determining which of the wireless communications units 51-1 to 51-n each of the terminal stations is to be connected to. The switching policy includes setting a condition for switching that one of the wireless communications units 51-1 to 51-*n* which is to be connected, for each of the terminal stations.

For each of the wireless communications units 51-1 to 51-*n*, the setting unit 54 sets the setting policy for setting the RTS/CTS function and NoACK function as well as the switching policy for determining which of the wireless communications units 51-1 to 51-*n* each of the terminal stations is to be connected to. That is, based on the setting policy and switching policy calculated by the policy calculation unit 53, the setting unit 54 sets the terminal station to be connected for each of the wireless communications units 51-1 to 51-*n*.

The storage unit 55 stores, for example, information and the like collected by the collection unit 52. The control unit 56, which includes a no-illustrated CPU and memory, controls various parts of the base station 5.

Thus, the wireless communications units 51-1 to 51-*n* conduct wireless communications independently of one another, with one of the first terminal station 10, second terminal station 20, third terminal station 30, and fourth terminal station 40, based on the setting policy for the RTS/CTS function and NoACK function, the setting policy having been set by the setting unit 54. That is, the wireless communications system 1 is made up of the base station 5 connected with the first terminal station 10, second terminal station 20, third terminal station 30, and fourth terminal station 40 differing in environment and transmission characteristics, where the base station 5 is equipped with plural wireless communications units 51-1 to 51-*n* each configured to be connectable with one or more of the terminal stations.

Then, the wireless communications units 51-1 to 51-*n* switches connection of the first terminal station 10, second terminal station 20, third terminal station 30, and fourth terminal station 40 based on the switching policy about connectable terminal stations, the switching policy being set by the setting unit 54. Also, the setting policy and switching policy for the wireless communications units 51-1 to 51-*n* are updated when the setting policy and switching policy calculated by the policy calculation unit 53 based on the information collected by the collection unit 52 are set by the setting unit 54.

Next, a concrete operation example of the wireless communications system 1 will be described.

FIG. 4 shows exemplary classes of terminal stations in the wireless communications system 1. In the table shown in FIG. 4, the first column shows classes of terminal stations, and it is assumed here that the classes are A, B, C, and D.

The second column shows whether or not the terminal stations are in a hidden-terminal environment. In the second column, the cross (x) indicates that the terminal station is in a hidden-terminal environment. The circle (○) indicates that the terminal station is not in a hidden-terminal environment.

Also, the third column shows whether or not the NoACK function is available for use. In the third column, the cross indicates that the NoACK function is unavailable. The circle (○) indicates that the NoACK function is available.

Here, the first terminal station 10 shown in FIG. 1 belongs to class A, the second terminal station 20 belongs to class B, the third terminal station 30 belongs to class C, and the fourth terminal station 40 belongs to class D.

Settings appropriate to the classes of the corresponding terminal stations are made on the wireless communications units 51-1 to 51-*n* of the base station 5. At least one of the wireless communications units 51-1 to 51-*n* are configured to be connectable with plural classes of terminal stations. For example, at least one of the wireless communications units 51-1 to 51-*n* enables the RTS/CTS function compatible with all the classes A, B, C, and D and disables the NoACK function. Therefore, it can be said that the first terminal station 10, second terminal station 20, third terminal station 30, and fourth terminal station 40 give higher priority to communications quality than to transmission efficiency regardless of their classes.

Figure 5:
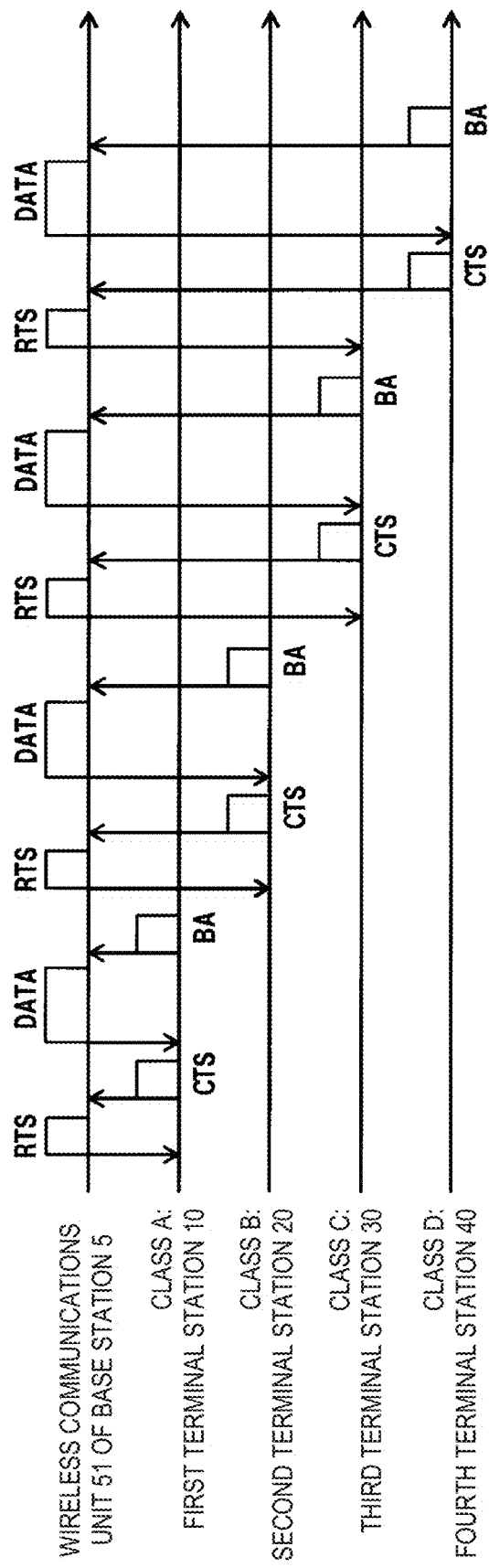
FIG. 5 is a diagram showing a communications example in which plural classes of terminal stations are accommodated in a wireless communications unit.

FIG. 5 shows a communications example in which plural classes of terminal stations are accommodated in any one (hereinafter referred to simply as the wireless communications unit 51) of the wireless communications units 51-1 to 51-*n*. Here, RTS (Request to Send) and CTS (Clear to Send) signals are to be transmitted to solve a hidden-terminal problem, which is a problem unique to wireless LANs, in transmitting data.

Individual data transmissions as well as BA (Block Ack), which is an acknowledge signal, are used because of the likelihood of retransmission.

In this way, when the RTS/CTS function is enabled and the NoACK function is disabled, plural control signals are included, creating an overhead and thereby causing reduction in transmission efficiency.

Figure 6:
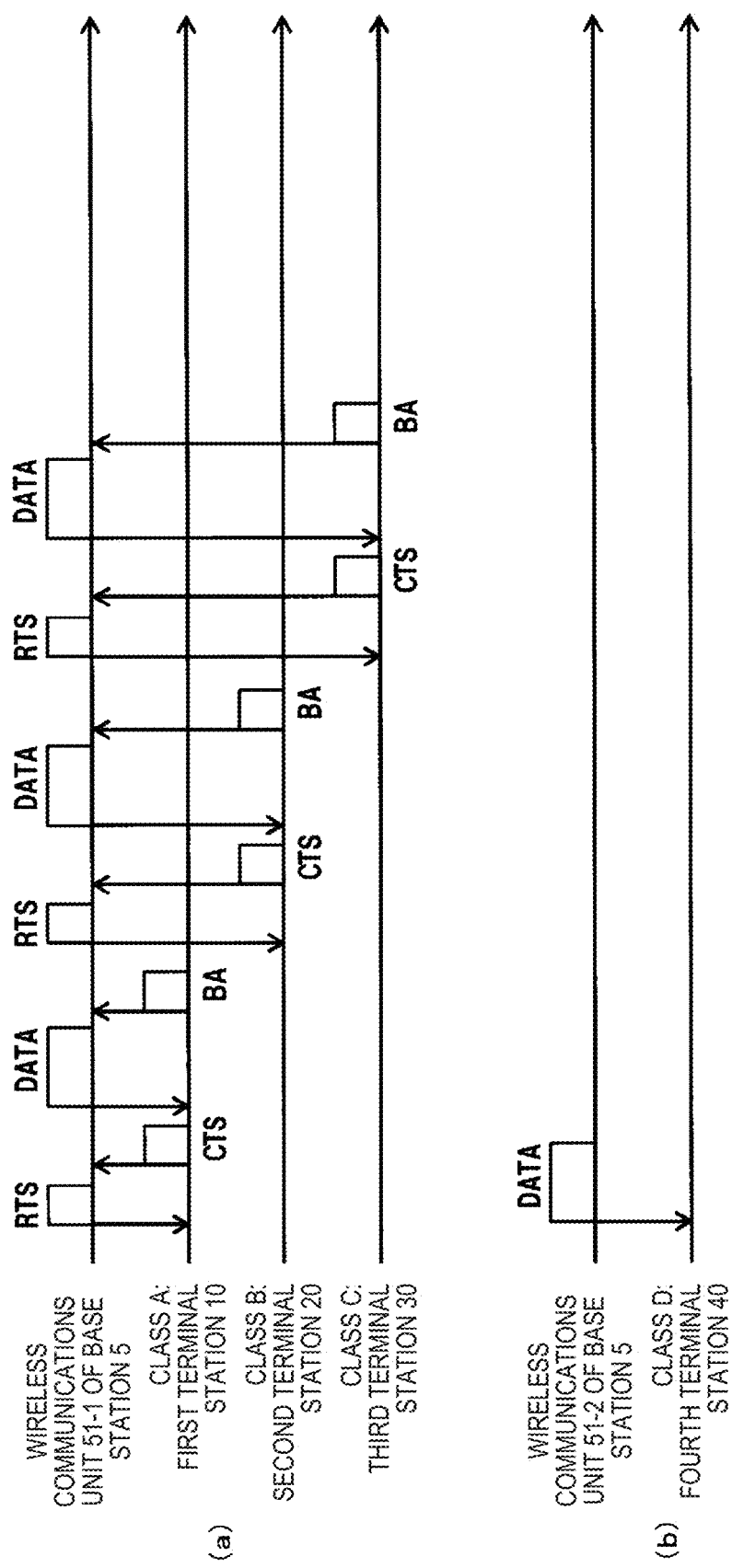
FIG. 6(a) is a diagram showing a communications example in which a first terminal station of class A, a second terminal station of class B, and a third terminal station of class C are connected to a wireless communications unit of the base station
FIG. 6(b) is a diagram showing a communications example in which a fourth terminal station of class D is connected to a wireless communications unit of the base station.

FIGS. 6(*a*) and 6(*b*) show examples in which terminal stations are accommodated on a class by class basis in some of different wireless communications units 51-1 to 51-*n*. FIG. 6(*a*) shows a communications example in which a first terminal station 10 of class A, second terminal station 20 of class B, and third terminal station 30 of class C are connected to the wireless communications unit 51-1 of the base station 5. FIG. 6(*b*) shows a communications example in which a fourth terminal station 40 of class D is connected the wireless communications unit 51-2 of the base station 5.

In the example shown in FIG. 6(*a*), the wireless communications unit 51-1, which supports all the classes of A, B, and C, exchanges data with each of the terminal stations by enabling the RTS/CTS function and disabling the NoACK function.

In the example shown in FIG. 6(*b*), the wireless communications unit 51-2, which supports class D, exchanges data with the terminal station by disabling the RTS/CTS function and enabling the NoACK function.

In this way, to increase the transmission efficiency of each terminal station, preferably the wireless communications system 1 selectively enables or disables the RTS/CTS function and NoACK function according to the classes of each terminal station.

For that, the setting unit 54 sets the setting policy and switching policy for each of the wireless communications units 51-1 to 51-*n*, where the setting policy is used to set the RTS/CTS function and NoACK function and the switching policy is used to determine the wireless communications units 51 to be connected with the terminal stations.

Figure 7:
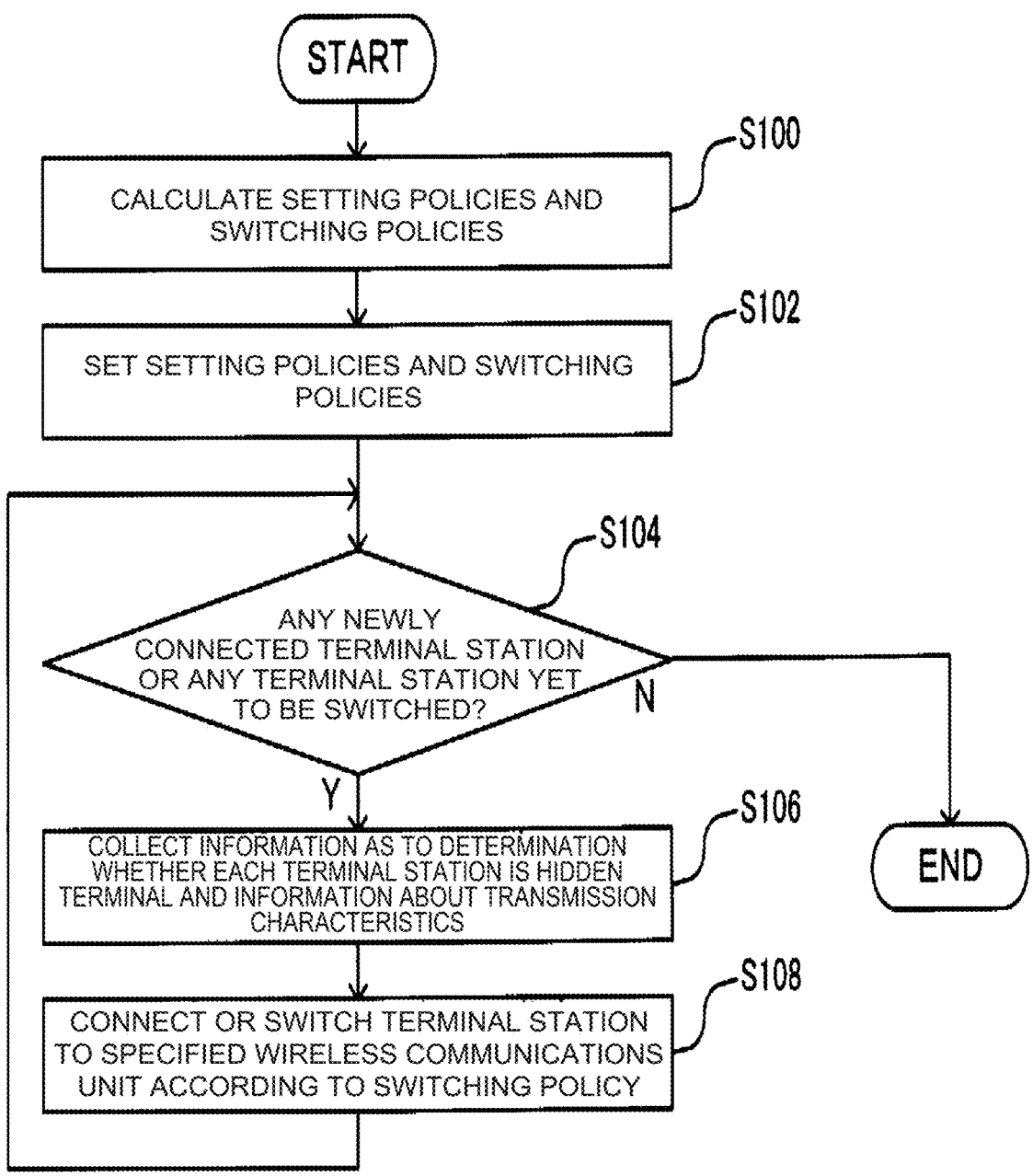
FIG. 7 is a flowchart showing a first operation example of a base station that uses a setting policy and switching policy.

FIG. 7 is a flowchart showing a First operation example of the base station 5 that uses the setting policy and switching policy. The policy calculation unit 53 of the base station 5 (FIG. 3) calculates the setting policies and switching policies for the classes of the terminal stations (S100).

Specifically, based on the information collected by the collection unit 52, or the preset number of connected terminal stations, class of each terminal station, and estimated traffic volume, the policy calculation unit 53 calculates predicted throughputs available when combinations of all or part of setting policies and switching policies are applied and selects the setting policy and switching policy that will maximize the predicted throughput, as calculation results.

Then, the setting unit 54 sets setting policies and switching policies for the wireless communications units 51-1 to 51-*n*, the setting policies and switching policies having been calculated by the policy calculation unit 53 for the respective classes of the terminal stations (S102). The processes of S100 and S102 are default processes of the base station 5.

Next, the collection unit 52 determines whether there is any newly connected terminal station or any terminal station yet to be switched (S104). If there is no newly connected terminal station or terminal station yet to be switched, the processing is finished. If there is any newly connected terminal station or any terminal station yet to be switched, the flow goes to the process of S106.

In the process of S106, the collection unit 52 collects information as to whether each terminal station is a hidden terminal (determination information) and information about transmission characteristics (throughput characteristics, MCS, etc.). Here, the collection unit 52 collects information as to whether each terminal station is a hidden terminal through determination from interference power among stations in the service area.

Then, according to the switching policy calculated by the policy calculation unit 53, the setting unit 54 connects or switches the terminal station to a specified wireless communications unit 51 (S108). Then, the base station 5 returns to the process of S104 and repeats the process until there is no longer any newly connected terminal station or terminal station yet to be switched.

Note that the determination in the process of S104 as to whether there is any newly connected terminal station or any terminal station yet to be switched may be made by the control unit 56 based, for example, on a state, stored in the storage unit 55, as to how the processes of S106 and S108 are carried out on each of the terminal stations.

Also, concrete switching methods for switching the connection destination of the terminal station from the current wireless communications unit 51 to another wireless communications unit 51 include the following method. For example, there is a method whereby the base station 5 cuts wireless connection with the terminal station by transmitting a deauthentication frame or disassociation flame and ignores or rejects a reconnect request to any wireless communications unit 51 other than the wireless communications unit 51 that is to become the connection destination after the switching. Also, if a connect request from a terminal station is not directed at the wireless communications unit 51 specified (set) by the setting policy and switching policy, the base station 5 may instruct the terminal station to reconnect to the specified wireless communications unit 51.

In this way, since the wireless communications units 51 to be connected with terminal stations are determined based on the setting policy and switching policy, the wireless communications system 1 can improve transmission efficiency compared to a conventional wireless communications system in which terminal stations select and connect to wireless communications units at random.

Next, relationships between the setting policy/switching policy and operation of the base station 5 will be described with reference to FIGS. 8 and 9.

FIG. 8 shows a relationship between the class of terminal stations and setting policy. FIG. 9 shows a relationship between the class of terminal stations and switching policy. As shown in FIGS. 8 and 9, suppose, for example, settings corresponding to classes A, B, and C of terminal stations are setting policy X1 and switching policy Y1, and settings corresponding to class D of terminal stations are setting policy X2 and switching policy Y2. Although the combination of classes classified by the setting policy and the combination of classes classified by the switching policy are identical here, the combinations may differ from each other.

In the example shown in FIGS. 8 and 9, the base station 5 sets the setting policy X1 and switching policy Y1, for example, for the wireless communications unit 51-1 and performs control such that the first terminal station 10 of class A, second terminal station 20 of class B, and third terminal station 30 of class C will be connected to the wireless communications unit 51-1.

In so doing, suppose the fourth terminal station 40 of class D is connected to the wireless communications unit 51-1, according to the switching policy Y2, the base station 5 switches the connection destination of the fourth terminal station 40, for example, to the wireless communications unit 51-2 in which the setting policy X2 for accommodating terminal stations of class D has been set up.

Also, the base station 5 sets the setting policy X2 and switching policy Y2, for example, for the wireless communications unit 51-2 and performs control such that the fourth terminal station 40 of class D will be connected to the wireless communications unit 51-2.

In so doing, suppose the wireless communications unit 51-2 is connected with the first terminal station 10 of class A, according to the switching policy Y1, the base station 5 switches the connection destination of the first terminal station 10, for example, to the wireless communications unit 51-1 in which the setting policy X1 for accommodating terminal stations of class A has been set up.

FIG. 10 is a flowchart showing a second operation example of the base station 5 that uses the setting policy and switching policy.

First, the collection unit 52 of the base station 5 (FIG. 3) collects information about the selectable functions by the terminal station (S200).

Next, if it is found necessary to update the terminal station classes, setting policies, or switching policies based on the information collected by the collection unit 52, the policy calculation unit 53 of the base station 5 newly calculates the setting policies and switching policies for the terminal station classes and thereby updates the setting policies and switching policies (S202). For example, if the throughput falls below a threshold, the policy calculation unit 53 newly calculates the setting policies and switching policies.

The setting unit 54 sets the newly calculated setting policies and switching policies for the wireless communications units 51-1 to 51-*n*, the setting policies and switching policies having been newly calculated for the terminal station classes by the policy calculation unit 53 (S204). For example, if any of the terminal station classes, setting policies, and switching policies have been updated by the policy calculation unit 53, the setting unit 54 sets updated contents for the wireless communications units 51-1 to 51-*n*.

Then, based on the switching policies newly set by the setting unit 54, the base station 5 connects or switches the terminal stations to specified wireless communications units 51 (S206).

Note that although in the present invention, description has been given by citing an example in which the RTS/CTS function and NoACK function are selectively enabled or disabled, the wireless communications system 1 may set transmission intervals of beacon signals on the wireless communications units 51. Specifically, the wireless communications system 1, which is characterized in that stability of connection varies from terminal station to terminal station with the beacon transmission interval, may increase the transmission efficiency by maximizing the beacon transmission intervals according to characteristics of the terminal stations.

Also, the collection unit 52, policy calculation unit 53, setting unit 54, and the like provided on the base station 5 of the present invention can be implemented by a computer and programs, where the programs can be recorded on a recording medium or provided via a network.

REFERENCE SIGNS LIST

1 Wireless communications system
5 Base station
10 First terminal station
20 Second terminal station
30 Third terminal station
40 Fourth terminal station
102 Wireless communications unit
104 Notification unit
50 Antenna
51-1 to 51-$n$ Wireless communications unit
52 Collection unit
53 Policy calculation unit
54 Setting unit
55 Storage unit
56 Control unit

The invention claimed is:

1. A wireless communication method for connecting a base station with each of a plurality of terminal stations, the base station being equipped with a plurality of wireless communications units each configured to be able to selectively enable or disable an RTS/CTS function and a NoACK function and connectable with one or more of the terminal stations, the method comprising:

a collection step of collecting information as to whether each of the terminal stations is a hidden terminal and information about transmission characteristics of each of the terminal stations;

a policy calculation step of calculating a setting policy for enabling or disabling the RTS/CTS function and the NoACK function for each of the wireless communications units and a switching policy for setting a condition for switching that one of the wireless communications units which is to be connected, for each of the terminal stations, based on the collected information; and a setting step of setting those of the terminal stations which are to be connected, for each of the wireless communications units based on the calculated setting policy and switching policy.

2. A base station connected with each of a plurality of terminal stations, the base station comprising:

a plurality of wireless communications units each configured to be able to selectively enable or disable an RTS/CTS function and a NoACK function and connectable with one or more of the terminal stations, a collection unit configured to collect information as to whether each of the terminal stations is a hidden terminal and information about transmission characteristics of each of the terminal stations;

a policy calculation unit configured to calculate a setting policy for enabling or disabling the RTS/CTS function and the NoACK function for each of the wireless communications units and a switching policy for setting a condition for switching that one of the wireless communications units which is to be connected, for each of the terminal stations, based on the information collected by the collection unit; and a setting unit configured to set those of the terminal stations which are to be connected, for each of the wireless communications units based on the setting policy and switching policy calculated by the policy calculation unit.

* * * * *